Patented July 15, 1952

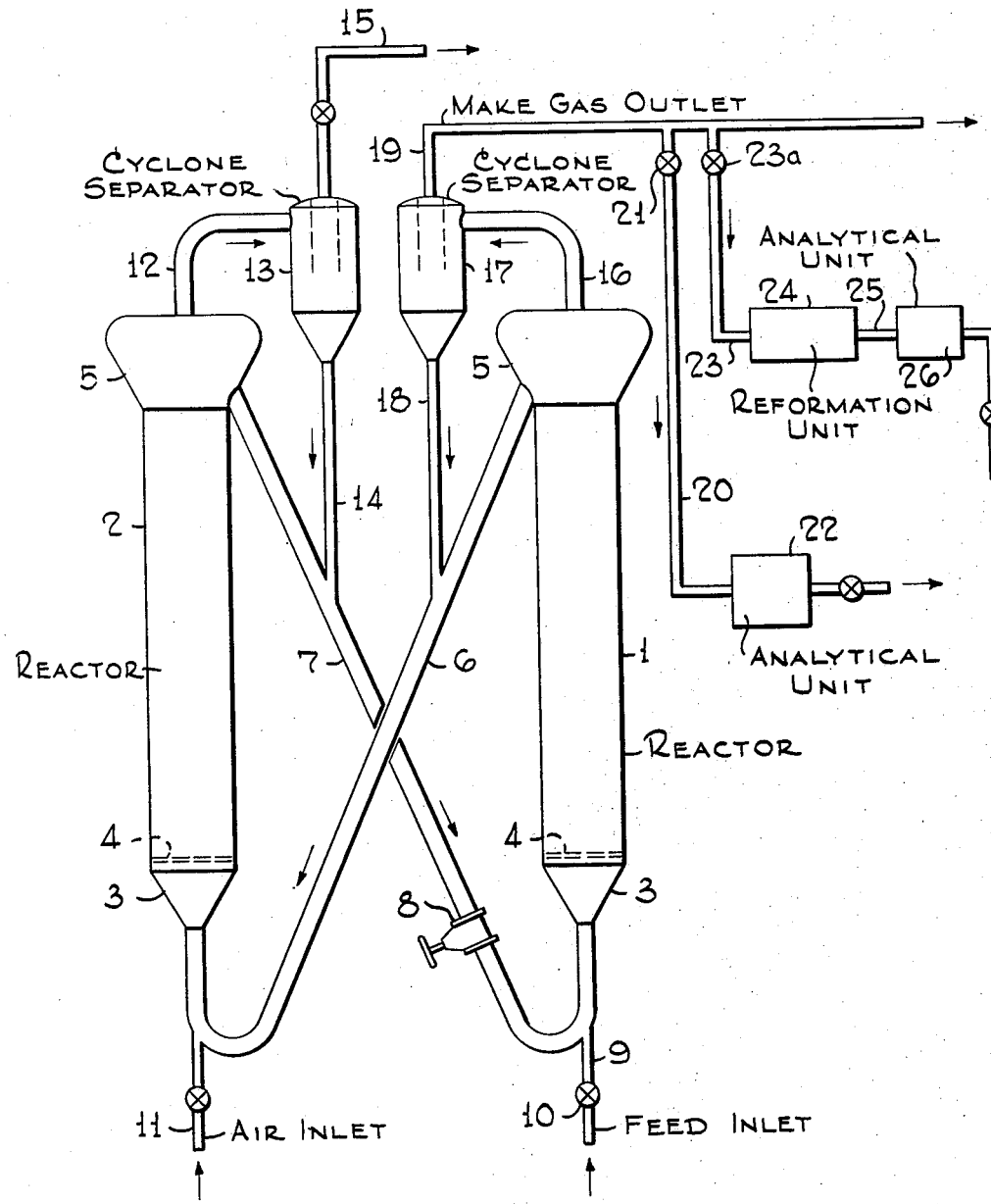

2,603,608

UNITED STATES PATENT OFFICE 2,603,608

CONTROL METHOD IN REACTIONS BETWEEN HYDROCARBONS AND METAL OXIDES

Warren K. Lewis, Newton, and Edwin R. Gilliland, Arlington, Mass., assignors to Standard Oil Development Company, a corporation of Delaware Application November 29, 1950, Serial No. 198,144

12 Claims. (Cl. 252—373)

The present invention, which is a continuation-in-part of Serial No. 32,704, filed June 12, 1948, now abandoned, is directed to the production of gases containing carbon monoxide and hydrogen by the reaction between a hydrocarbon and a reducible metal oxide, and more particularly, to a control mechanism for this reaction.

The reaction between a hydrocarbon and a reducible metal oxide for the production of gases containing carbon monoxide and hydrogen is known. Of the metal oxides which have been proposed for this reaction, one of the few which has an oxidizing potential such as to direct the conversion of the hydrocarbon gases only to carbon monoxide and hydrogen is zinc oxide. Because of the low distillation temperature of zinc and the difficulty of handling zinc vapors, and the low hydrocarbon conversions attainable therewith, this metal oxide does not offer much promise for a commercial operation. This has caused the investigation in this field to be centered on other metal oxides, all of which seem to have oxidizing potentialities such that unless the oxidation is carefully controlled, the conversion of the hydrocarbon goes in a large measure to the production of carbon dioxide and water. As a matter of fact, it appears that with all these other metal oxides the reaction first goes predominantly to carbon dioxide and water and the resulting mixture of unconverted hydrocarbon, carbon dioxide and water undergoes a reformation in contact with the metal, the oxide of which supplied the oxygen. Thus, in carrying out this process with all metal oxides except zinc oxide and the like, the "make gas" contains carbon dioxide and water and some unconverted hydrocarbon.

It has been proposed to practice this process by utilizing the so-called fluidized solid technique in a continuous process employing two reaction zones, in one of which hydrocarbon continuously contacts a fluidized bed containing metal oxide and in the other of which air continuously contacts a fluidized bed containing free metal and in which there is continuous circulation between the two beds. In this type of operation the solid contacting agent is in the form of particles, none of which has a size substantially greater than 100 mesh and a large proportion of which have a size between 200 and 400 mesh and some of which may have a much smaller size down to about 5 microns. Best fluidization is obtained when there is a fairly wide distribution of particle sizes. The contacting gases pass upwardly through a bed of such particles at a velocity such as to hold the particles in suspension in a dense turbulent condition. Ordinarily this velocity will be between .3 and 5 feet per second, usually in the lower end of the range, the values given being superficial velocity of the gas through an empty contacting zone.

A particular proposal has been to maintain in the hydrocarbon conversion zone a bed composed, substantially completely, of metal, either as such or supported on a suitable carrier, and to add to this bed, continuously, an amount of metal oxide such as to supply one atom of oxygen for each atom of carbon fed into the zone. This type of operation has been applied specifically to copper oxide and it has been found that when careful control is exercised, the "make gas" can be composed almost entirely of carbon monoxide and hydrogen. The experimental evidence clearly indicates that the course of the reaction is such that part of the hydrocarbon is converted completely to carbon dioxide and water before the remainder of the hydrocarbon is converted. In this reaction all of oxygen supplied by the metal oxide is consumed and the residual hydrocarbon reacts with the carbon dioxide and water in the presence of the copper to yield carbon monoxide and hydrogen.

In order to produce continuously a "make gas" of fairly uniform composition, according to the procedure outlined above, continuous control must be exercised on the feed rates of the hydrocarbon and metal oxide to the hydrocarbon conversion zone. The operator must be able to tell quickly when his "make gas" deviates from the desired composition so as to be able to make quickly, the necessary adjustments to maintain the composition of the "make gas" uniform. Thus, the desired conversion product may be a gas containing two mols of hydrogen per mol of carbon monoxide, if the gas is to be employed, say, for the hydrocarbon synthesis reaction; or the desired composition may also include a gas comprising a greater or smaller fixed desired amount of carbon dioxide in accordance with the purpose for which the gas is to be employed. In other words, the operator must be able to ascertain if he is feeding to the hydrocarbon conversion zone the proper ratio of oxygen as metal oxide to carbon as methane to obtain the gas of desired composition and he must also always be able to ascertain if the reforming reaction is going to completion or, if not, whether he is maintaining a desired conversion level within the reactor, that is, if he wishes to obtain a gas having any desired carbon dioxide content. Thus, the operator may be feeding the proper proportion of metal oxide and methane but the reforming activity of the contact mixture in the hydrocarbon conversion zone may fall below the desired conversion level, so that the composition of the "make gas" suffers.

Ordinarily, in order properly to operate the reforming reaction taking place in a conversion zone, a complete analysis of the off-gas would be required. This gas customarily contains five components, namely, hydrogen, carbon monoxide, carbon dioxide, unreacted methane and water vapor. However, a good rapid analysis for hydrogen and carbon monoxide is not available, while rapid effective analysis of the gas stream for unreacted methane is practically unfeasible. If it is found that the gas stream is off composition, correction has to be made at once and the prior art has disclosed hitherto no means whereby such aberration in the off-gas may be determined adequately, rapidly and accurately.

According to the present invention, control of the operation of the aforesaid type is readily effected by making a few simple determinations on the "make gas," in place of a complete time-consuming analysis. For complete control, the operator must first determine the carbon dioxide content of the "make gas." Then, according to the present invention, the operator subjects a small quantity of the "make gas" to a reformation operation in which is utilized a highly active catalyst at a temperature sufficiently high to secure completion of the reforming reaction. The operator then determines the carbon dioxide content of the product of this reforming reaction. In order to make possible control of this type it is necessary to feed to the reactor an amount of oxygen as oxide, slightly in excess of at least the stoichiometric equivalent of the carbon to produce carbon monoxide. In other words, it is necessary to insure that the "make gas" will always contain some carbon dioxide. Thus, the control method does not provide for maintenance of precise stoichiometrical quantities of one to one atomic ratio of oxygen and carbon in the feed to the hydrocarbon conversion zone but for the maintenance of the slight excess of oxygen within those proportions which may be tolerated.

If, in the practice of the control method of the present invention, the carbon dioxide content of the "make gas" exceeds a predetermined quantity, the operator knows that he is feeding an excess of oxygen as oxide over the predetermined amount to the hydrocarbon conversion zone, or that the reforming reaction in the conversion zone is not going to completion. Then, if the off gas from the pilot reforming operation contains an amount of carbon dioxide in excess of that predetermined for satisfactory operation, he knows that he is feeding too much oxygen to the hydrocarbon conversion zone and can either reduce the oxygen feed or increase the hydrocarbon feed correspondingly. On the other hand, if the product gas from the pilot reforming operation contains an amount of carbon dioxide predetermined for satisfactory operation he knows that, the carbon dioxide content of the "make gas" being excessive, the reforming operation in the hydrocarbon conversion zone is not going to completion. This can be compensated for in the ordinary case by increasing the temperature in the hydrocarbon conversion zone or increasing the residence time of the reactants by slowing down the gas velocity in the hydrocarbon conversion zone or increasing the amount of solids held up in the conversion zone. However, should the operator desire to maintain less than complete conversion of hydrocarbon, the operator is in position to make such minor adjustments so as to maintain a constant difference between the carbon dioxide content of the effluent from the pilot unit and that from the analytical unit. Therefore, if the operator was getting a 100% conversion in the main reactor, then the composition of the "make gas" would be identical with the composition of the pilot unit product gas.

Several types of devices for quickly determining the carbon dioxide content of a gas are known and any of these may be employed in the practice of the present invention. For example, the infrared ray spectrometer quickly and accurately gives a measure of very minute amounts of carbon dioxide in gas; also, a conventional pH meter may be employed for this purpose, utilizing water as the medium in which the hydrogen electrode is immersed and passing the gas to be examined through the water. These and other types of indicators indicate the carbon dioxide content of the gas as an electrical quantity. This electrical quantity may be utilized to actuate valves controlling the feed of metal oxide or hydrocarbon or both to the hydrocarbon conversion zone. These specific control arrangements constitute no part of the present invention since, for the purpose of the present invention, the operator, having made the determinations which constitute the real control method of the present invention, can manipulate the feeds of the hydrocarbon and the metal oxide manually.

In the pilot reforming operation of the present invention there is employed a highly active catalyst such as nickel-alumina catalysts prepared by co-precipitation of the nickel oxide and alumina, or even a copper-silica gel catalyst which may likewise be prepared by a co-precipitation method or by impregnation of silica gel with a copper salt solution, followed by the usual drying, roasting and reducing steps. These catalysts are highly effective catalysts in this reforming operation, even at temperatures as low as 1600° F. In order, however, to insure completion of this reaction, this pilot reforming unit is operated at a temperature between 2000° and 2400° F.

By way of explanation, it may be pointed out that if, in those cases where it is desired to produce a mixture of carbon monoxide and hydrogen, e. g., to be used in the hydrocarbon synthesis process, the feeds of oxygen and carbon to the main process were in exactly stoichiometrical amounts for the production of carbon monoxide and hydrogen the gas produced in the pilot reforming step would contain only traces of carbon dioxide, regardless of what happened in the main process. If the oxygen fed to the main process were supplied in excess of the amount necessary to convert the carbon fed to carbon monoxide, the products of the pilot reforming operation would contain a small amount of carbon dioxides which can be determined by calculation, regardless of what happened in the main process. Therefore, in accordance with one embodiment of the present invention, control of the process is predicated on maintaining a content of carbon dioxide in the product gas of the pilot reforming operation between fixed relatively narrow limits, as for example, between ½ and 2% or perhaps between 1 and 3%. These limits are desirable when the product gas is to be used in the synthesis of hydrocarbons from carbon monoxide and hydrogen formed in the reformer and in which process it is customary not to employ excessive quantities of carbon dioxide in the synthesis feed gas. However, should it be desired to employ the gas for other purposes, which purposes may envisage the presence of a gas containing larger quantities of $CO_2$, the effluent from the pilot reactor need not be restricted to a $CO_2$ limit of 3%, but may be as high as 12–15% in some gases.

If the carbon dioxide content of the gas from the pilot unit falls below the fixed minimum, the operator knows that his feed of oxygen to the hydrocarbon conversion step is deficient. On the other hand, if the carbon dioxide content of this gas exceeds the fixed maximum, the operator knows that his oxygen feed to the hydrocarbon conversion step is excessive. It is to be emphasized, however, that knowledge of this one fact is not adequate to insure proper control of the main process for the production of the desired "make gas." In addition the operator has to know the carbon dioxide content of the "make gas" itself.

The nature of the present invention may be more fully understood from the following detailed description of the accompanying drawing in which the single figure is a front elevation in diagrammatic form of a simplified apparatus illustrating the manner in which the method of the present invention is practiced.

Referring to the drawing in detail, numeral 1 designates a hydrocarbon conversion reactor, and 2 designates a metal oxide reactor. Each of these reactors is provided at its lower end with a constricted portion 3, surmounted by a grid 4 and at its upper end with an expanded portion 5. Depending from the expanded portion 5 of reactor 1 is an overflow pipe 6 which is connected to the constricted portion of reactor 2. In like manner, an overflow pipe 7 connects the expanded portion 5 of reactor 2 with the restricted portion to the reactor 1. This pipe is provided with a slide valve or with another feed control element 8.

A feed line 9 for hydrocarbon gas is provided below the constricted portion 3 of reactor 1. This feed line is preferably arranged so as to pick up finely divided solid leaving the lower end of pipe 7 and carry it up into reactor 1. In like manner, there is provided below the constricted portion 3 of reactor 2, a feed line 11 for air, arranged to pick up finely divided solid leaving the lower end of overflow pipe 6 and carry it up through reactor 2. A sufficient quantity of solids is maintained in the system so that when it is in operation finely divided solids are continuously overflowing from each reactor into the other.

Residual air leaves the top of 2 through line 12 which discharges into a cyclone 13 from the bottom of which separated solid is returned to pipe 7 through leg 14 and from the top of which residual air leaves the system through line 15.

"Make gas" leaves the top of reactor 1 through line 16 which discharges into a separator 17 from the bottom of which separated solid is returned to pipe 6 through leg 18 and from the top of which "make gas" leaves the system through line 19.

Attached to line 19 is a branch line 20 controlled by a valve 21. This line conducts a small portion of the "make gas" to an analytical unit 22 which is a suitable device of the type heretofore specified for indicating the carbon dioxide content of the "make gas." Also attached to line 19 is a branch line 23 controlled by a valve 23a by manipulation of which a measured amount of "make gas" can be fed continuously to a reformation unit 24. This unit is illustrated merely as a reactor 24 which is loaded with reforming catalysts and is suitably heated by an electrical coil. It will be apparent, of course, that this reforming unit may assume many forms. It may, for example, be a unit operated according to the fluidized solid technique. The off gas from this unit is piped by line 25 to an analytical unit 26 which will, in the ordinary case, be the same as unit 22.

The operating conditions in the main process constitute no part of the present invention. It may be mentioned, however, that the hydrocarbon conversion unit will usually be operated at a temperature between about 1500° F. and 2000° F., depending upon the metal oxide employed and upon the reforming catalyst employed. When copper oxide is utilized, it is present as a composite with a suitable carrier, silica gel being preferred. The silica gel may carry between 3 and 30% of copper, the quantity preferably being in the lower end of the range so as to provide for a greater transport of heat between the metal oxide zone and the hydrocarbon conversion zone. With copper the hydrocarbon conversion is preferably maintained between 1600° F. and 1850° F. In this operation, when an approximately 2/1 $H_2$/CO hydrocarbon synthesis gas is being prepared, the feed of copper oxide to the hydrocarbon conversion is regulated so as to be between about ½ and 2% in excess of the stoichiometrical amount to convert the carbon fed to this zone to carbon monoxide.

As has been pointed out, the control method employed in accordance with the present invention is well adapted to utilization in the production of hydrocarbon synthesis gas. In the production of the latter it is preferable to operate in order that the off-gas should have a carbon dioxide content lower than about ½% and generally 3% $CO_2$ should not be exceeded. The $CO_2$ content of the gas, however, depends upon the skill of the operator, the analytical control, the type of catalyst, the ratio of the reactants and other variables. Where reaction control is good, 3% $CO_2$ should not have been exceeded.

Instead of preparing synthesis gas in accordance with the process described heretofore, it may be desired to produce a metallurgical reducing gas, the reducing power of which is controlled for the selective reduction of a particular metal oxide, for example, such as the reduction of $Fe_2O_3$ to $Fe_3O_4$ or the reduction of a tin ore containing iron oxide. In the latter case, selective reduction of the tin oxide should be accomplished without reducing the iron oxide to metallic iron. Partial reduction of the iron oxide does not hinder separation of the metallic tin reduced from the tin oxide. This type of reducing gas requires a high $CO_2$ to CO ratio to keep the iron from being reduced too far. When it is desired to make such a gas, the unit for reforming the hydrocarbon reducing agent must be operated accordingly. The allowable $CO_2$ to CO ratio in the reducing gas coming into contact with the ore is a function of the temperature of the reduction operation. Thus, for example, if the tin ore is being reduced at 800° C. it is desirable to keep the $CO_2$ to CO ratio above 0.53 to prevent reduction of FeO, while at 600° C.

the ratio should be above 0.85. It is usually desirable to operate the reforming unit, which is producing the reducing gas, for maximum conversion of hydrocarbon. Where it is practicable to recycle gas leaving the reduction unit back to its intake, it becomes desirable to reform to a low $CO_2$ content, and control the $CO_2$ to CO ratio entering the reducer by the rate of this recycle.

The essential facts underlying this invention, which make it possible to determine the performance of a reforming unit by making only two analytical determinations, namely, the $CO_2$ contents of the reformed gas on the one hand and of the gas from the pilot reforming unit on the other, are two. In the first place, at the temperature levels involved these catalysts employed for the reforming reactions are such good catalysts for the so-called water gas shift reaction, $CO_2+H_2=CO+H_2O$, that the gases leaving the reformer are substantially at equilibrium from the point of view of water gas shift. The constant of the reaction is well known and is dependent on the temperature. Consequently, knowing the actual operating temperature of the reforming unit from which the gas sample comes, one knows the value of this constant. It is true that the reaction may shift somewhat as the gas sample is removed for analysis unless the sampling technique provides adequately rapid temperature quenching. Even so, it is found that, for any reasonable technique of sample withdrawal which provides rapid cooling, the change in the value of the constant from that corresponding to the temperature of the reformer itself is small enough so that a calibration of the apparatus by the determination of this modified value of the constant by complete analysis of gas samples removed under normal operating conditions is satisfactory for the carrying out of the invention. Therefore, knowing the value of the constant thus determined corresponding to the actual measured operating temperature of the reforming unit in question and knowing the composition of the hydrocarbons or other fuel fed to the reformer, by means of hydrogen and carbon balances, the knowledge of the $CO_2$ content of the gas is enough to enable one to compute the composition of the reformed gas. The second essential fact is that by operating a reformer with an active catalyst, used in sufficient quantity, at temperatures of 2000° F. and above, the conversion of any hydrocarbon or equivalent material in the feed to water gas is substantially complete.

As a further illustration of an application of the present invention, the following example is given.

*Example*

In a reforming operation using substantially pure methane, wherein it is desired to produce approximately a 2/1 $H_2$/CO gas for hydrocarbon synthesis purposes, the reforming unit is operated at 1650° F. At this reformer temperature the calibration of the sampling equipment shows that one obtains a water gas shift constant of approximately 0.8. The pilot unit is operated at 2000° F. and at this temperature its calibration shows a constant of 0.48. The $CO_2$ content of the reformer gas is found to be 3.5% on a dry basis and of the outlet gas from the pilot unit, 0.6%. This is all the factual information needed for applying the invention in this case.

From this information it follows that the product gas from the pilot unit is 0.6% $CO_2$, 33.55% CO and 65.85% $H_2$ on a dry basis and that on this same basis it contains 2.45% of water vapor. This is an atomic ratio of oxygen to carbon of 1.09. Applying this figure to the data on the reformer gas, its analysis turns out to be 3.5% $CO_2$, 29.9% CO, 58.25% $H_2$ and 8.35% methane, together with 8.56% water. In other words, the methane conversion in the reformer is only 80%. To achieve the results desired, the operator must take suitable steps to get higher conversion in the primary reformer and should, if possible, achieve this with a lower excess oxygen relative to methane fed to the reformer as metal oxide.

Once the control operations are functioning satisfactorily, there is no need for the operator to go through the details of computation given above. For given reforming temperatures, the $CO_2$ determinations disclose immediately whether the operation is going as it should and, if not, what changes must be made to bring it into line.

The nature and objects of the present invention having been described and illustrated, they are not intended to be limiting in any way.

What is claimed is:

1. In a process in which a hydrocarbon is partially reacted in a conversion zone with a readily reducible metal oxide to produce oxides of carbon, hydrogen and water and the resulting mixture containing unreacted hydrocarbons is subjected to a reforming operation within the same conversion zone to produce a "make gas" comprising carbon monoxide and hydrogen, the improvement which comprises supplying to said conversion zone oxygen as metal oxide equivalent to at least more than one atom of oxygen for each atom of carbon added as hydrocarbon, producing a "make gas" in said conversion zone containing a minor quantity of carbon dioxide, passing a gas stream comprising a minor portion of said "make gas" to a zone indicating the carbon dioxide content of said gas, subjecting another portion of said "make gas" to a reforming operation in a reforming zone controlled to insure complete reaction of any hydrocarbon by carbon dioxide and water contained in said "make gas," passing the gaseous effluent from said last-named zone to a zone indicating the carbon dioxide content of said effluent and controlling the reaction conditions in said first-named reaction zone responsive to the carbon dioxide content of said gas streams, to insure the desired methane conversion.

2. The process of claim 1 wherein the said rates of said initial reactants to said initial reaction zone are controlled responsive to said carbon dioxide content.

3. The process of claim 1 wherein the temperature in said initial conversion zone is controlled responsive to said carbon dioxide content.

4. The process according to claim 1 wherein the feed of metal oxide and hydrocarbon to said initial reaction zone is controlled so as to maintain the carbon dioxide content of the product gas from the reformation of the "make gas" at least about ½%.

5. The process of claim 4 wherein said carbon dioxide content of the product gas is between about ½ and 3%.

6. The process according to claim 1 in which the amount of oxygen relative to the carbon fed to the reaction zone is controlled so as to be at least about ½% in excess of the stoichiometrical amount necessary to convert carbon to carbon monoxide.

7. The process of claim 6 wherein said metal oxide is ½ to 2% in excess of the stoichiometric amount of oxygen.

8. The process according to claim 1 wherein said metal oxide is copper oxide supported on a carrier.

9. The process of claim 8 wherein said carrier is silica gel.

10. The process according to claim 1 in which the "make gas" is reformed by being contacted with copper supported on silica gel at a temperature of between about 2000° and 2400° F.

11. The process of claim 1 wherein said effluent from said auxiliary reforming zone has a carbon dioxide content in the range of 0.5 to 15%.

12. An improved process for preparing gas adapted to be employed in the hydrocarbon synthesis operation containing substantially 2 mols of hydrogen per mol of carbon monoxide, which comprises passing slightly more than one atom of copper oxide per mol of methane to a catalytic methane reforming zone wherein initially oxides of carbon, hydrogen and water are produced and the resulting mixture is subjected to a reforming operation with unreacted methane to produce a "make gas" composed essentially of carbon monoxide and hydrogen and a minor quantity of carbon dioxide, passing said minor portion of said "make gas" to a zone indicating the carbon dioxide content of said gas, passing another minor portion of said "make gas" to a reforming operation in an auxiliary reforming zone controlled to insure complete reaction of unreacted methane with carbon dioxide and water contained in said "make gas," passing the gaseous effluent from said last-named zone to a zone indicating the carbon dioxide content thereof and controlling the reaction conditions in said first-named reaction zone responsive to the carbon dioxide content of said gas streams.

WARREN K. LEWIS.
EDWIN R. GILLILAND.

No references cited.